United States Patent
Van Zee et al.

(10) Patent No.: US 7,267,899 B2
(45) Date of Patent: Sep. 11, 2007

(54) METHOD AND SYSTEM FOR IMPROVING THE PERFORMANCE OF A FUEL CELL

(76) Inventors: John W. Van Zee, Department of Chemical Engineering, University of South Carolina, Columbia, SC (US) 29208; Woo-kum Lee, Dept. of Chemical Engineering, Univ. of South Carolina, Columbia, SC (US) 29208; Mahesh Murthy, 201 Airport Rd., Elkton, MD (US) 21922-1488

( * ) Notice: Subject to any disclaimer, the term of this patent is extended or adjusted under 35 U.S.C. 154(b) by 308 days.

(21) Appl. No.: 10/385,420

(22) Filed: Mar. 10, 2003

(65) Prior Publication Data

US 2003/0232227 A1 Dec. 18, 2003

Related U.S. Application Data

(60) Provisional application No. 60/362,693, filed on Mar. 8, 2002, provisional application No. 60/363,200, filed on Mar. 11, 2002.

(51) Int. Cl.
*H01M 8/04* (2006.01)
(52) U.S. Cl. .............................. 429/25; 429/22; 429/13
(58) Field of Classification Search ................... 429/25
See application file for complete search history.

(56) References Cited

U.S. PATENT DOCUMENTS

| | | | |
|---|---|---|---|
| 4,639,306 A | 1/1987 | Tomasovic et al. | |
| 4,820,386 A | 4/1989 | LaConti et al. | |
| 5,041,195 A | 8/1991 | Taylor et al. | |
| 5,133,842 A | 7/1992 | Taylor et al. | |
| 5,173,166 A | 12/1992 | Tomantschger et al. | |
| 5,302,274 A | 4/1994 | Tomantschger et al. | |
| 5,677,073 A | 10/1997 | Kawatsu | |
| 5,712,052 A | 1/1998 | Kawatsu | |
| 5,843,195 A | 12/1998 | Aoyama | |
| 5,876,867 A | 3/1999 | Itoh | |
| 5,897,766 A | 4/1999 | Kawatsu | |
| 5,925,476 A * | 7/1999 | Kawatsu ..................... 429/24 |
| 6,099,708 A | 8/2000 | Mallory et al. | |
| 6,120,925 A | 9/2000 | Kawatsu et al. | |
| 6,129,825 A | 10/2000 | Mallory et al. | |

(Continued)

FOREIGN PATENT DOCUMENTS

JP  08-138710  *  5/1996

*Primary Examiner*—Patrick Joseph Ryan
*Assistant Examiner*—Tony Chuo
(74) *Attorney, Agent, or Firm*—McNair Law Firm, P.A.

(57) ABSTRACT

An electrochemical fuel cell system comprising a fuel supply of hydrogen rich gaseous fuel for delivery to a fuel cell. A fuel supply conduit connects the fuel supply and the fuel cell for delivering a fuel stream of the hydrogen rich gaseous fuel to the fuel cell. An impurity sensor is carried by the fuel supply conduit for detecting impurities in the fuel stream prior to the impurities entering the fuel cell. A pressure adjusting mechanism is provided in communication with the impurity sensor being operatively associated with the fuel cell for changing the pressure of the fuel cell. The pressure adjusting mechanism raises the pressure of the fuel cell from a normal operating pressure to an elevated operating pressure when the impurity sensor detects impurities in the fuel stream to prevent the impurities from interfering with fuel cell efficiency.

10 Claims, 4 Drawing Sheets

U.S. PATENT DOCUMENTS

| | | |
|---|---|---|
| 6,165,633 A | 12/2000 | Negishi |
| 6,200,443 B1 | 3/2001 | Shen et al. |
| 6,210,820 B1 | 4/2001 | Knights et al. |
| 6,290,913 B1 | 9/2001 | Aoyama |
| 6,331,694 B1 | 12/2001 | Blankenship |
| 6,332,901 B1 | 12/2001 | Nagamiya et al. |
| 6,358,638 B1 | 3/2002 | Rock et al. |
| 2002/0081471 A1* | 6/2002 | Keegan et al. ................ 429/25 |

* cited by examiner

FIGURE 3    Performance Comparison of Transient Process with
10,000 ppm CO for 5 seconds at 600 mA/cm$^2$
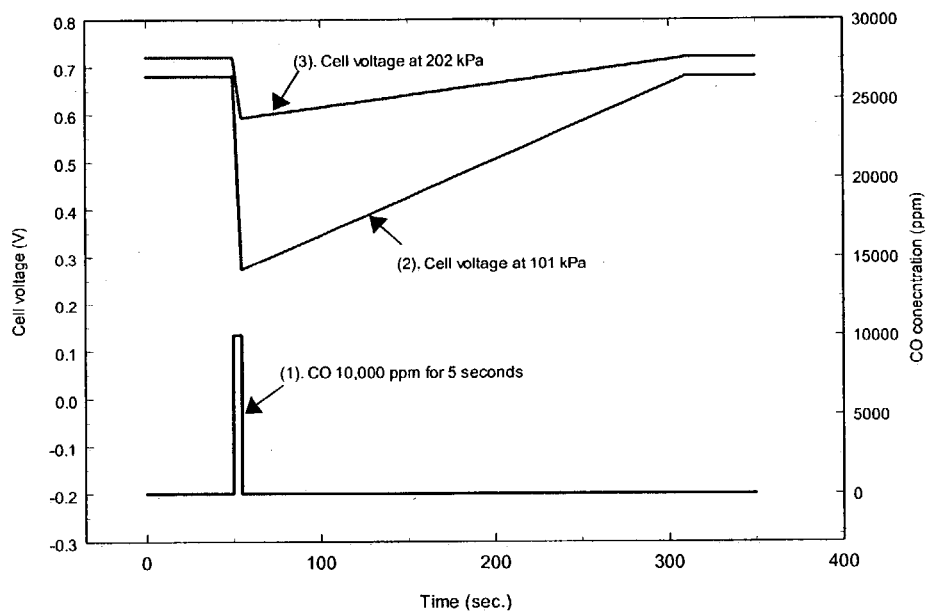
FIGURE 4    Recovery Scheme for Fuel Cell Performance during exposure to
10,000 ppm CO for 5 seconds at 600 mA/cm$^2$
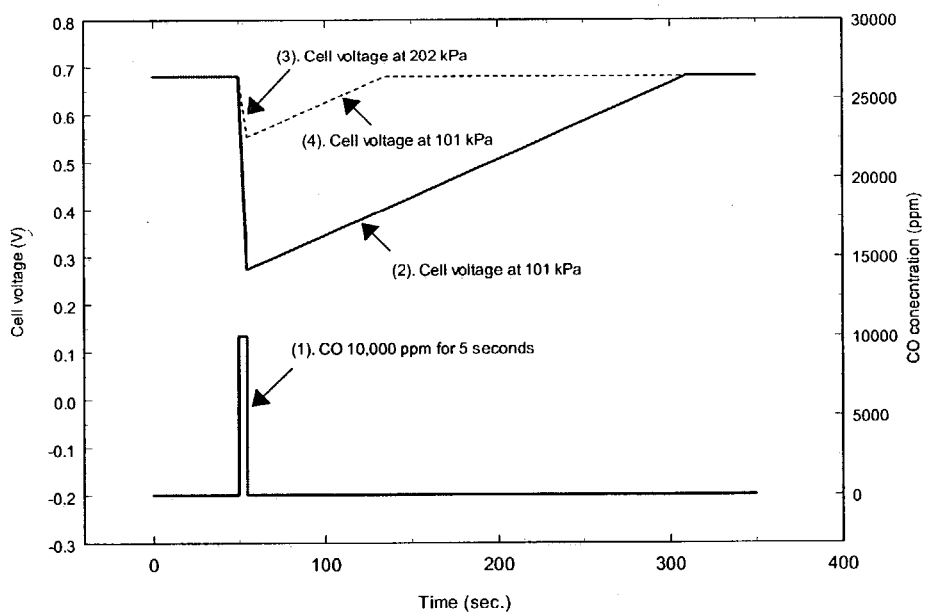

METHOD AND SYSTEM FOR IMPROVING THE PERFORMANCE OF A FUEL CELL

Applicant claims priority of provisional application Nos. 60/362,693 filed Mar. 8, 2002 and 60/363,200 filed Mar. 11, 2002.

FIELD OF THE INVENTION

The present invention relates to a method and system for improving the performance of electrochemical fuel cells, and more particularly, to a method and system for varying the pressure within the fuel cell to diminish electrocatalyst poisoning caused by impurities in the fuel stream.

BACKGROUND OF THE INVENTION

As the power needs of society increase and with the depletion of fossil fuels, there is a need for power services that provide clean efficient power. Such needs exist both for mobile applications such as the automotive industry and stationary applications as powering manufacturing facilities or commercial enterprises. To meet these needs, electrochemical fuel cells have been developed to convert the chemical energy of a fuel directly into electrical energy thereby providing a clean and efficient source of electrical power. Generally, a fuel cell includes a pair of electrodes arranged across an electrolyte, wherein the surface of one electrode is exposed to hydrogen or a hydrogen rich gaseous fuel, and the surface of the other electrode is exposed to an oxygen-containing oxidizing gas, typically air. Inside the fuel cell, hydrogen rich gas from the fuel source reacts electrochemically at a first electrode (anode) and is converted into protons and electrons by a catalyst. When converted, the protons move through an electrolyte to a second electrode (cathode) that also includes a catalyst. The catalyst induces oxygen from an air supply to combine with the hydrogen protons and electrons to form water, which is expelled from the fuel cell as vapor. The involvement of hydrogen and oxygen in the two reactions, one releasing electrons and the other consuming them, yields electrical energy across the anode and cathode by way of an external circuit, thereby generating electrical power.

Many electrochemical fuel cells employ a membrane electrode assembly ("MEA") in which the intermediate electrolyte comprises a solid polymer electrolyte or ion-exchange membrane disposed between two porous electrically conductive electrode layers (the anode and the cathode). At the anode, the fuel ($H_2$) is directed through a porous layer of the anode where it can be oxidized by the electrocatalyst to produce protons and electrons from the hydrogen rich fuel. The protons migrate through the polymer electrolyte membrane toward the cathode electrocatalyst to bind with the oxygen and separated electrons from the hydrogen. Once across the polymer electrolyte membrane, the oxidant ($O_2$) enters through the porous cathode to react with the protons and electrons on the cathode electrocatalyst to form water. The electrons travel from the anode to the cathode through an external circuit, which produces an electrical current.

The basic reaction for powering a hydrogen based the fuel cell is as follows:

$$\text{Anode: } 2H_2 \rightarrow 4H^+ + 4e^-$$

$$\text{Cathode: } O_2 + 4H^+ + 4e^- \rightarrow 2H_2O$$

$$\text{Overall: } 2H_2 + O_2 \rightarrow 2H_2O$$

A process known as reforming produces hydrogen from hydrocarbon fuels such as methanol or gasoline. Unfortunately, the stream of fuel produced by a reformer contains impurities that inhibit the desired electrochemical reaction within the fuel cell. These impurities are absorbed chemically or physically on the surface of the anode electrocatalyst and prevent $H_2$ from bonding to active electrocatalyst sites on the anode where it can be broken down into its protons and electrons. By disrupting the anode reaction, the number of electrons, traveling from anode to cathode is reduced and the efficiency of the fuel cell is detrimentally affected. Impurities in the fuel stream that reduce the efficiency are known as electrocatalyst "poisons" and their effect on fuel cells is known as "electrocatalyst poisoning." Electrocatalyst poisoning results in reduced fuel cell performance thereby reducing the voltage output of the fuel cell for a given current density.

Reformate fuel streams derived from hydrocarbons such as methanol ($CH_3OH$) contain high concentrations of $H_2$ and are well suited to fuel the electrochemical fuel cell. However, such fuels also contain electrocatalyst poisons such as carbon monoxide (CO) that exist in relatively small quantities in the fuel stream used to supply hydrogen rich gas to the fuel cell. The basic reactions for using methanol fuel to provide a hydrogen rich gas through a reformer for the fuel cell is shown as follows:

$$(1)\ CH_3OH \rightarrow 2H_2 + CO$$

$$(2)\ CO + H_2O \rightarrow H_2 + CO_2$$

$$\text{Overall: } CH_3OH + H_2O \rightarrow 3H_2 + CO_2$$

However, the above reactions do not practically result in the conversion of 100% of the carbon monoxide to $CO_2$ and causes this impurity to enter the fuel cell. In fact, most reformers typically produce hydrogen gas containing up to 1% carbon monoxide. Additional steps can be taken to further reduce the carbon monoxide levels to around 10–100 ppm, but under normal operation of the reformer, there are transients that may cause the carbon monoxide levels to exceed the set points of normal operation for the reformer and the fuel cell. Even minute amounts of carbon monoxide can cause substantial degradation of the fuel cell performance. To reduce the effects of poisoning on the anode electrocatalyst by impurities like carbon monoxide created by the incomplete reaction of trace amounts of carbon monoxide from the above equation, it is possible to pre-treat the fuel supply stream prior to it entering the fuel cell. However, these pretreatment methods for fuel streams cannot effectively remove 100% of the carbon monoxide or other impurities that interfere with fuel cell efficiency. Even trace amounts of 10 ppm can result in electrocatalyst poisoning and cause a substantial reduction in fuel cell performance. Increasing the pressure of a fuel cell can reduce the ability of impurities to bond with the electrocatalyst. However, maintaining the fuel cell at a higher pressure reduces both the operational life of the fuel cell as well as the recovery rate of the fuel cell. Recovery rate is the rate at which voltage rates increase from a poisoned state to a normal state over time and generally measure in volts per minute. For example, a poisoned fuel cell with 3000 ppm CO may recover at 0.10 V/min at 101 kPa, but recovery only at 0.04 V/min at 202 kPa. Additionally, higher pressures can damage the fuel cell and MEA resulting in a shortened operational life. Therefore, maintaining a higher pressures reduce the overall efficiency and useful life of the fuel cell. It should be noted that while carbon monoxide is used in the above discussion, other impurities such as $H_2S$, $NH_3$, or other elements or compounds also degrade the performance of fuel cells at both the anode and cathode. Impurities can exist at the cathode that also degrade performance of the fuel cell and include air polluted with hydrocarbons such as that found in close proximate to combustion engines or fuel stations. Accordingly, the ability to reduce electrocatalyst poisoning of a fuel cell is a problem to which significant attention should be directed.

Therefore, it is an object of the present invention to manipulate the pressure of a fuel cell to reduce the ability of impurities in the fuel cell fuel stream to bind with active electrocatalyst sites.

It is another object of the present invention to manipulate the pressure of the fuel cell to reduce the effect of impurities while reducing deterioration of the membrane electrode assembly.

It is another object of the present invention to manipulate the pressure of a fuel cell to enhance voltage recovery rates to provide a more uniform power output of the fuel cell.

SUMMARY OF THE INVENTION

The above objectives are accomplished according to the present invention by providing an electrochemical fuel cell system adapted for maintaining the efficient production of electrical power. The system comprises a fuel supply containing a hydrogen rich gaseous fuel for delivery to a fuel cell. A fuel supply conduit connects the fuel supply and the fuel cell for delivering a fuel stream of the hydrogen rich gaseous fuel to the fuel cell. An impurity sensor is carried by the fuel supply conduit for detecting impurities in the fuel stream prior to the impurities entering the fuel cell. A pressure adjusting mechanism is in communication with the impurity sensor being operatively associated with the fuel cell for changing the pressure of the fuel cell. The pressure adjusting mechanism raises the pressure of the fuel cell from a normal operating pressure to an elevated operating pressure when the impurity sensor detects impurities in the fuel stream. As a result, the detrimental effect of impurities in the fuel stream on the normal operation of the fuel cell is reduced.

In the preferred embodiment, the impurity sensor is constructed and arranged to detect a rise or drop in the level of impurities in the fuel stream from a predetermine level of impurities. The impurity sensor signals the pressure adjusting mechanism to raise the pressure of the fuel cell from the normal operating pressure to the elevated operating pressure when the impurity sensor detects a rise in the level of impurities in the fuel stream above the predetermined level. The impurity sensor signals the pressure adjusting mechanism to cease raising the pressure of the fuel cell and return the fuel cell to the normal operating pressure when the impurity sensor detects a drop in the level of impurities in the fuel stream below the predetermined level.

In a further advantageous embodiment, a control unit is in electronic communication with the impurity sensor and the pressure adjusting mechanism. The control unit monitors the level of impurities detected by the impurity sensor and signals the pressure adjusting mechanism to raise the pressure of the fuel cell to the elevated operating pressure when a rise in the level of impurities is detected above a predetermined level. The control unit signals the pressure adjusting mechanism to cease raising the pressure of the fuel cell and return the fuel cell to the normal operating pressure when the level of impurities monitored by the control unit and detected by the impurity sensor drops below the predetermined level. Preferably, the pressure adjusting mechanism includes a backpressure regulator and a gas output control valve connected to the fuel cell operatively associated with the backpressure regulator. The backpressure regulator is in electronic communication with the control unit for monitoring the operating pressure of the fuel cell and activating the gas output control valve to restrict or increase the flow of gas through the fuel cell to raise and lowering the operating pressure of the fuel cell as necessary.

In a further advantageous embodiment, the pressure adjusting mechanism includes a gas output control valve operatively associated with the fuel cell. The gas output control valve closes to restrict the flow of gas out of the fuel cell to raise the operating pressure of the fuel cell, and the gas output control valve opening to allow the flow of gas out of the fuel cell to maintain the normal operating pressure.

In a further advantageous embodiment, the pressure adjusting mechanism includes a fuel pump operatively associated with the fuel stream. The fuel pump increases the rate of delivery of the fuel stream to the fuel cell to raise the operating pressure of the fuel cell, and the fuel pump reducing the rate of delivery of the fuel stream to the fuel cell to lower the operating pressure of the fuel cell.

Preferably, a voltage sensor is provided for detecting a rise or drop in the voltage of the fuel cell from a predetermined voltage level. The voltage sensor is operatively associated with the pressure adjusting mechanism to increase the pressure of the fuel cell to the elevated operating pressure when a drop in voltage is detected below the predetermined voltage level to remove impurities from the fuel cell. The voltage sensor is operatively associated with the pressure adjusting mechanism to cease raising the temperature of the fuel cell and return the fuel cell to the normal operating pressure when the voltage sensor detects a return in voltage to the predetermined voltage level.

Alternatively, the pressure adjusting mechanism may be activated to raise the pressure of the fuel cell to the elevated operating pressure for a predetermined period of time upon detection of an impurity in the fuel stream. The pressure adjusting mechanism is then deactivated after the predetermined period of time to return the fuel cell to the normal operating pressure so that after the impurity has pass completely through the fuel cell, the operating pressure can be decreased to preserve operational life of the fuel cell.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 3 is a graph showing the fuel cell voltage and affects of concentration of carbon monoxide two pressure levels;

FIG. 4 is a graph showing the fuel cell voltage and affects of concentration of carbon monoxide with and without the benefits of this invention; and, FIG. 5 is a flowchart depicting the steps involved in changing the pressure of the fuel cell.

DETAILED DESCRIPTION OF THE PREFERRED EMBODIMENTS

The present invention diminishes the effects of electrocatalyst poisoning by providing a method and system for varying the pressure of the fuel cell according to the level of impurities present in the fuel stream. The pressure inside the fuel cell can be changed from the normal operating pressure to a higher operating pressure when a burst of carbon monoxide or other impurities are detected in the fuel stream. An impurity sensor is disposed along a fuel supply conduit to detect increased levels of impurities before the impurity can enter the fuel cell. It is to be understood that various types of impurity sensors can be utilized to detect a variety of impurities in the fuel stream, such as CO, $NH_3$ and $H_2S$ sensors. For illustrative purposed of a preferred embodiment, the impurity sensor is a carbon monoxide sensor. Additionally, the preferred embodiment is described for a polyelectrolyte membrane fuel cell (PEMFC) such as a membrane electrode assembly (MEA) marketed under the trademark PRIMEA®. A pressure change of 101 kPa to 202 kPa for this fuel cell, occurring with a constant temperature, diminishes the poisoning rate of impurities on the electrocatalyst. This pressure change is accomplished through the introduction of a backpressure regulator located downstream of the fuel cell. In the preferred embodiment, the carbon monoxide sensor sends a signal to a control unit when a burst of carbon monoxide from a reformer is detected. The control unit then closes a control valve preventing the outflow of gas from the fuel cell. With the fuel stream providing a constant stream, the pressure is increased in the fuel cell to prevent the binding of impurities on the electrocatalyst either by chemical or physical absorption to the electrocatalyst. In an alternative embodiment, the fuel stream can be injected at a higher rate on the input side to increase the pressure of the fuel cell. This embodiment does not, however, contain a backflow regulator since such device would prevent pressure increasing in the fuel cell. Unfortunately, when some impurities do bind to the electrocatalyst, the higher pressure reduces the removal of impurities from the electrocatalyst, thereby reducing the voltage recover rate. Therefore, once the impurity level in the fuel stream returns to an acceptable concentration, reducing the operating pressure from the elevated pressure to the normal operating pressure assists in increasing the recovery rate from any poisoning that may have occurred and also decreases the detrimental effect on the operational life of the fuel cell.

Figure 1:
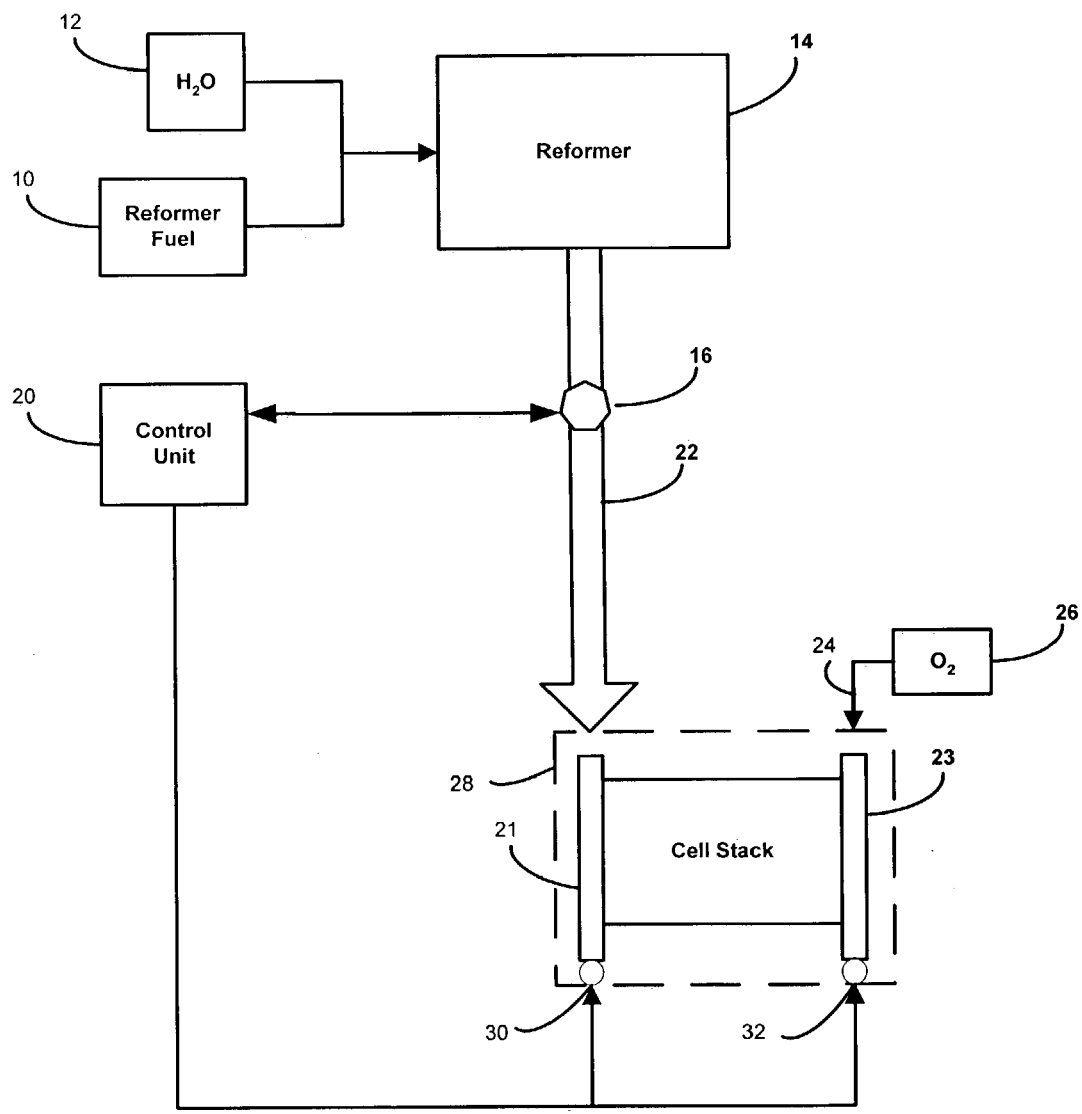
FIG. 1 is a schematic of the fuel cell system according to the present invention.

Referring now to the drawings, the invention will be described in more detail. FIG. 1 shows a schematic of the fuel cell system according to the present invention. A reformer 14 receives methanol, hydrocarbon or other fuel from a fuel supply tank 10, along with water from a water supply tank 12 for producing a hydrogen-rich gas that supplies hydrogen to the fuel cell. The reformer injects the $H_2$ fuel, together with trace amounts of CO and other compounds, into the fuel cell. A fuel supply conduit 22 feeds this stream of hydrogen-rich gas produced by the reformer to a fuel cell stack 28 at an anode electrocatalyst location, designated generally as 21. The construction of fuel cell stack 28 is well known by those skilled in the art, and the present invention can be applied to any of the currently known fuel cell structures and is not limited to any particular type of fuel cell arrangement. For alloy catalysts and low temperature membranes, normal operating temperature can be generally 70° C. at a pressure of 101 kPa. For ceramic membranes, normal operating temperatures can be significantly higher and be in the several hundreds of degrees with higher pressures. An impurity sensor 16 is disposed along fuel supply conduit 22 after reformer 14 but before the gas enters fuel cell stack 28. By detecting the impurity prior to the impurity reaching the fuel cell, the effect of the electrocatalytic poisoning can be minimized prior to experiencing the full effect. It is to be understood that various types of impurity sensors can be utilized to detect a variety of impurities in the fuel stream, such as CO, $NH_3$ and $H_2S$. For illustrative purposes of a preferred embodiment, the impurity sensor detects carbon monoxide. The anode and cathode sides of a fuel cell respectively carry output control valve 30 and 32. The control valves are in electronic communication with control unit 20. Upon sensing a predetermined level of poison, such as a burst of carbon monoxide, impurities sensor 16 sends a signal to control unit 20 that in turn sends a signal to one or more of the output control valves to close the valves to restrict outflow of gases from the fuel cell. Therefore, the outflow is at a lower rate than inflow and the pressure in the fuel cell in increased. Raising the pressure helps prevent the binding of impurities to the electrocatalyst either by chemical or physical absorption to the electrocatalyst. Since the higher pressure impedes the removal of impurities that do bind to the electrocatalyst, the pressure is lowered upon the detection of a poison level under a predetermined level thereby signaling the control unit to in turn signal the output valves to open so as to increase the output of gases from the fuel cell. Oxygen from air supply 26, is also included in the fuel supply delivered to the fuel cell stack. The oxygen is introduced into fuel cell stack 28 along cathode fuel conduit 24 at a cathode electrocatalyst location, designated generally as 23, for completing the oxidation reaction that completes the fuel cell electrochemical oxidation/reduction reaction. In an alternative embodiment, an additionally impurity sensor 16 can be placed in cathode fuel conduit 24 for detecting impurities in the oxygen supply to raise the operating temperature of the fuel cell stack to prevent the impurities from binding to the cathode.

Figure 2:
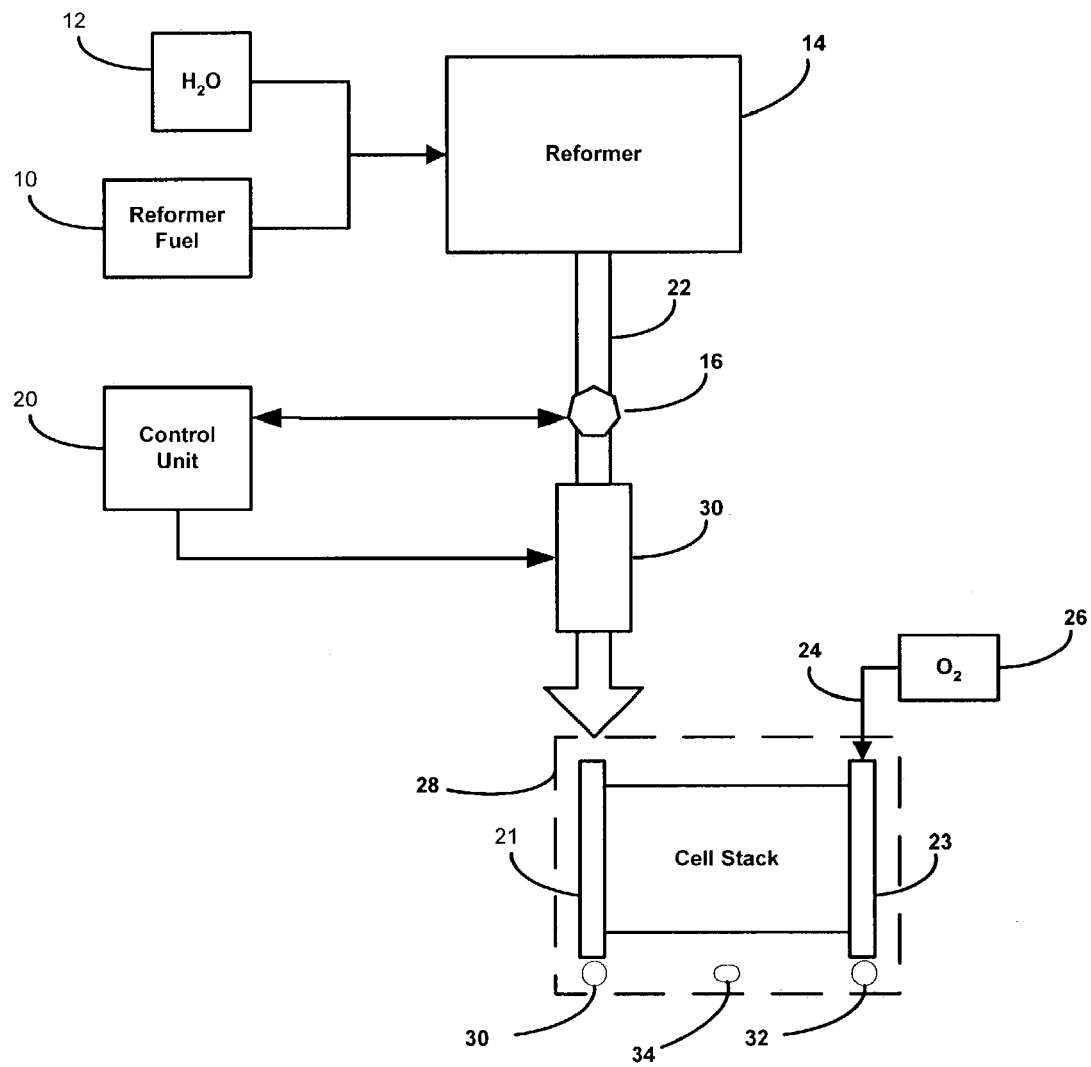
FIG. 2 is a schematic of the fuel cell system according to the present invention.

In an alternative embodiment, a fuel pump 30 (FIG. 2) can be used to increase the flow of the fuel stream entering the fuel cell. Again, this alternative embodiment would not contain a backflow regulator since such a device would prevent the pressure in the fuel cell from sufficiently rising. The pump is electronically connected to control unit 20 and by increasing the fuel stream flow, causes the input of gases to exceed the output of gases from the fuel cell and increase the pressure of the fuel cell. It should be noted that pump 30 can also be included within the reformer and control unit 20 need only signal the reformer to increase the fuel stream pressure or flow rate when necessary.

Impurities sensor 16 detects not only when the predetermined levels of impurities exist, but also when the impurity level is reduced below the predetermined level so as to allow the operating pressure to be reduced. By reducing the operating pressure from the higher pressure to the normal operating pressure, the recovery rates can be improved once the impurity level drops. Therefore, once impurity sensor 16 no longer detects elevated levels of carbon monoxide, it sends a signal to control unit 20 which in turn can signals the output control valves to open allowing the pressure in the fuel cell to drop. This allows the fuel cell to return to the normal operating conditions.

Controlling the pressure also extends the electrocatalyst operational life by only increasing the pressure during high levels of impurities. As a result, an electrochemical fuel cell with increased durability and more uniform power output is provided.

Table 1 illustrates the advantages of increasing and decreasing the pressure of a fuel cell in response to increased levels of impurities. The following is provided for a polymer electrolyte membrane fuel cell (PEMFC) using a membrane electrode assembly (MEA) but this invention is certainly not limited to this example. This table shows the dependence of poisoning and recovery rates on $CO/H_2$ mixture composition at 600 $mA/cm^2$ with neat hydrogen as the baseline. Exposure to CO and baseline level was 300 s and 1500 s respectively.

| | $T_{cell}$ = 70° C., P = 101 kPa | | $T_{cell}$ = 70° C., P = 202 kPa | |
| --- | --- | --- | --- | --- |
| $CO/H_2$ (ppm) | Poisoning rate (V/min) | Recovery rate (V/min) | Poisoning rate (V/min) | Recovery rate (V/min) |
| 500 | −0.46 | 0.14 | −0.10 | 0.03 |
| 3000 | −1.43 | 0.10 | −1.10 | 0.04 |
| 10000 | −4.80* | 0.10* | −1.56 | 0.03 |

*data obtained for 90s exposure to 10,000 ppm CO.

As shown above in Table 1, at a temperature of 70° C., an increase in the operating pressure of the fuel cell from 101 kPa to 202 kPa by restricting the flow of fuel with the output control valve at the downstream side of the fuel cell, the poisoning rate for carbon monoxide is decreased based upon competing absorption (both chemical and physical) and oxidation by either electrochemical or chemical means. Additionally, Table 1 shows that lowering the pressure of the fuel cell back to the ambient pressure of approximately 101 kPa once the carbon monoxide pulse has passed substantially increases the recovery rate of the fuel cell voltage. Thus, in the event that a pulse of carbon monoxide is introduced into the anode side of the fuel cell, lowering the pressure will require less time for the fuel cell to regain its peak operating efficiency. Additionally, increased pressure has a substantial adverse affect on the operational life of the polymer electrolyte membrane, thereby reducing the life of the fuel cell and the overall efficiency. Thus, when a burst of carbon monoxide is detected by carbon monoxide sensor 16, the effect of carbon monoxide poisoning on the electrocatalyst can be mitigated by increasing the operating pressure by signaling output control valve 30 or 32 to close thereby raising the pressure of the electrocatalyst in the PEMFC. Because the higher pressure over time will increase the recovery time and reduce the operational life of the fuel cell, it is beneficial to return the cell to the normal operating pressure of approximately 101 kPa as quickly as possible.

In an alternative embodiment, a backpressure regulator 34 is operatively associated with control unit 20. Backpressure regulator 34 monitors the pressure and opens and closes gas output control valves 30 and 32 as appropriate to maintain the higher operating pressure of 202 kPa, or to return the fuel cell to the normal ambient operating pressure when impurities return to acceptable levels as detected by impurity sensor 16. Since a pulse of carbon monoxide gas from reformer 14 is gone in a relatively short period of time, the fuel cell's performance is only minimally affected by carbon monoxide poisoning when the pressure is raised before the carbon monoxide can enter the fuel cell. By monitoring carbon monoxide levels in the fuel supply conduit with impurity sensor 16, it is possible to calculate the time that the carbon monoxide pulse will pass completely through the fuel cell. It is to be understood that this system and method can be applied to either a feed-forward or a feedback scheme and may be combined with a scheme that changes the temperature to further mitigate the effects of carbon monoxide poisoning on the fuel cell.

Normal operation of the fuel cell at ambient pressure is preferred because it may be difficult to maintain optimum humidity at the higher pressures and this optimum humidity is required for optimum MEA fuel cell performance. It is also important to maintain the ambient pressure as much as possible because higher pressures result in damage to the MEA and long-term durability issues, as well as the fact that high-pressure PEMFC operation may not match with the optimal system pressure.

In an alternative embodiment, a voltage sensor can be used to measure power output of the fuel cell in place of the impurities sensor. In this embodiment, the voltage sensor can transmit a signal either directly to gas output control valves 30 and 32, or signal control unit 20 to activate the output control valves to close when the voltage level drops below a predetermined level. Therefore, reacting to the resulting voltage drop by raising the pressure in the fuel cell can minimize the effect on voltage of any impurities entering the fuel cell. When the voltage is stabilized, the control unit can send a signal to the output control valves to open allowing the pressure to return to normal so as to reduce the detrimental effect of high pressure on the fuel cell. Additionally, a voltage sensor and impurities sensor can operate in combination to detect impurities and voltage drops so as to actuate the control unit to control the output control value or reformer so as to manipulate the pressure for enhanced performance of the fuel cell. Software in the control unit can detect the need to manipulating the pressure control valves through the impurities sensor or voltage sensor, send a control signal to close the pressure control valves, detect the end of a burst of impurities or voltage drop, and send a control signal to the pressure control valves opening them.

FIG. 3 illustrates fuel cell performance at constant pressures for both ambient operating pressure and increased operating pressure according to the present invention. Line 1 shows the transient in carbon monoxide concentration that is detected by carbon monoxide sensor 16. Lines 2 and 3 show the fuel cell performance at fixed cell temperature of 70° for backpressure of 101kPa and 202kPa respectively. Thus, when a burst of carbon monoxide is detected by impurity sensor 16, increasing operating pressure by closing control valve 30 mitigates the effect of carbon monoxide poisoning on the fuel cell's performance.

Addition, as shown by line 4 in FIG. 4, when the carbon monoxide pulse is gone, decreasing the operating pressure by opening control valves 30 and 32 once the carbon monoxide pulse has passed, enhances the voltage recovery rate of the fuel cell's performance.

Figure 5:
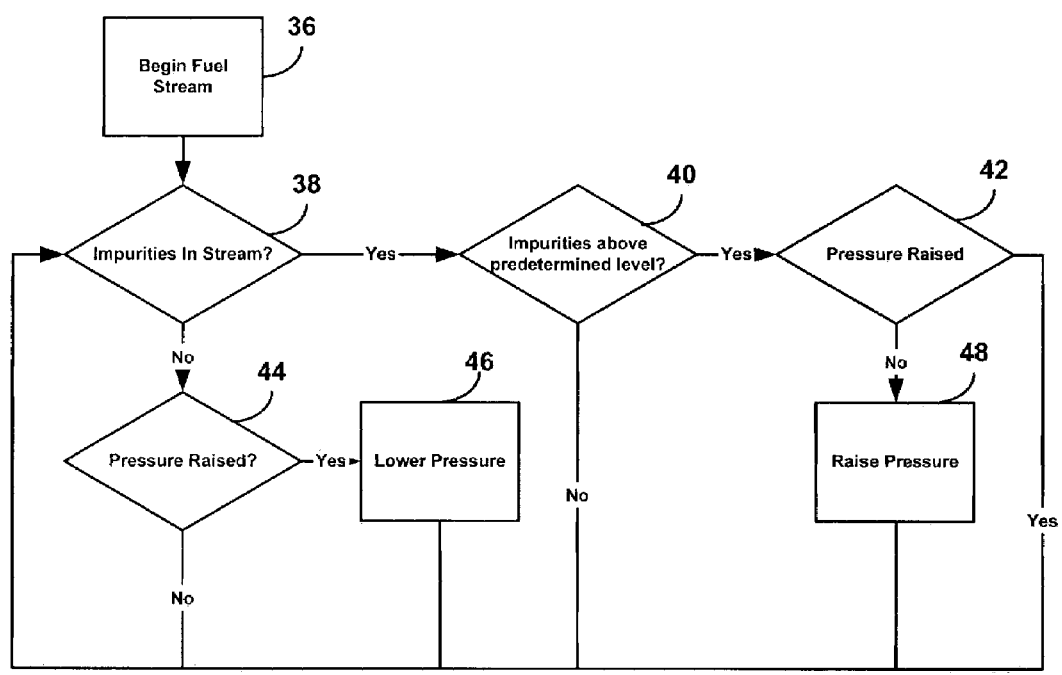

Referring now to FIG. 5, the method of operation of this invention is described in further detail. Additionally, the procedural descriptions are representations used by those skilled in the art to most effectively convey the substance of this work to others skilled in the art. These procedures are generally a self-contained sequence of steps leading to a desired result. In the event of the control unit, these steps require physical manipulations of physical quantities such as electrical and magnetic signals capable of being stored, transferred, combined, compared, or otherwise manipulated. Therefore, this invention is described with reference to flowchart illustrations of methods, apparatus, and computer program products according to the invention in order to convey the understanding that each block of the flowchart illustration can be implemented by a set of computer readable instructions embodied in a computer readable medium. These computer readable instructions may be loaded onto a general purpose computer, special purpose computer, or other programmable data processing apparatus to produce the machine for which the instructions will execute. It will be understood that each block of a flowchart illustration can be implemented by special purpose hardware based computer systems that perform this specific function, or steps, in combination with special purpose hardware or computer instructions.

Referring to FIG. 5, the fuel stream begins at step 36. A determination is made whether impurities exist in the fuel stream in step 38. If no impurities are detected, a determination is made on whether the pressure has previously been raised in step 44. If it has not, then the process returns to step 38. If in step 44, the pressure has previously been raised, then the pressure is lowered in step 46 and the process returns to step 38. In step 38, if impurities do exist in the fuel stream, a determination can be made as to whether the impurities are above a predetermined level in step 40. If they are not, then the process returns to step 42. In the event that the impurities are above a predetermined level, the determination is made as to whether the pressure has previously been raised in step 44. If it has, then the process returns to step 38. In the event that the pressure has not been raised in step 44, then the pressure is raised in step 48, and the process returns to step 38.

While a preferred embodiment of the invention has been described using specific terms, such description is for illustrative purposes only, and it is to be understood that changes and variations may be made without departing from the spirit or scope of the following claims.

What is claimed is:

1. A method of improving the efficiency of an electrochemical fuel cell system of the type having a fuel supply for delivering a hydrogen rich fuel stream through a fuel supply conduit to a fuel cell stack, said method comprising the steps of:
providing an impurity sensor carried by said fuel supply conduit communicating with said fuel stream passing therein for detecting impurities in said fuel stream;
detecting the presence of impurities in said fuel stream passing through said fuel supply conduit;
providing a pressure adjusting mechanism operatively associated with said fuel cell and communicating with said impurity sensor, wherein said pressure adjusting mechanism is operative to generate pressure within said fuel cell to raise said normal operating pressure of said fuel cell to an elevated operating pressure; and,
activating said pressure adjusting mechanism in response to detecting said said impurities to raise the pressure of said fuel cell to said elevated operating pressure before said impurities enter said fuel cell;
whereby, raising said normal operating pressure of said fuel cell to said elevated operating pressure before said impurities enter said fuel cell resists binding of said impurities within said fuel cell to maintain efficient electricity production.

2. The method of claim 1 including the step of detecting a drop in the level of said impurities in said fuel stream below a predetermined impurity level in said fuel stream passing through said fuel supply conduit.

3. The method of claim 2 including the step of deactivating said pressure adjusting mechanism to lower the pressure of said fuel cell to said normal operating pressure in response to detecting said drop in the level of said impurities below said predetermined impurity level.

4. The method of claim 1 including the step of activating said pressure adjusting mechanism to increase the rate of delivery of said fuel stream entering said fuel cell to raise the operating pressure of said fuel cell prior to said impurities entering said fuel cell.

5. The method of claim 1 including the step of closing a gas output control valve included in said pressure adjusting mechanism to raise the operating pressure of said fuel cell when said impurities are detected In said fuel stream before said impurities enter said fuel cell.

6. The method of claim 5 including the step of opening said gas output control valve to return the operating pressure of said fuel cell from said elevated operating pressure to said normal operating pressure when said impurities are no longer detected.

7. The method of claim 5 including the step of opening said gas output control valve after a predetermined period of time expires and said impurities in said fuel stream drop below a predetermined impurity level to reduce the pressure of said fuel cell to said normal operating pressure.

8. The method of claim 1 including the step of detecting a drop in voltage of said fuel cell from a predetermined voltage level.

9. The method of claim 8 including the step of activating said pressure adjusting mechanism to raise the pressure of said fuel cell to said elevated operating pressure upon detecting a drop in voltage below said predetermined voltage level.

10. The method of claim 9 including the step of deactivating said pressure adjusting mechanism to lower the pressure of said fuel cell to said normal operating pressure when said voltage sensor detects a return in voltage to said predetermined voltage level.

* * * * *